United States Patent [19]

Bowen

[11] Patent Number: 5,280,551

[45] Date of Patent: Jan. 18, 1994

[54] BACKPLANE OPTICAL SPINE

[75] Inventor: F. Wayne Bowen, Arlington Heights, Ill.

[73] Assignee: AT&T Bell Laboratories, Murray Hill, N.J.

[21] Appl. No.: 997,276

[22] Filed: Dec. 23, 1992

[51] Int. Cl.⁵ ............................................. G02B 6/36
[52] U.S. Cl. ...................................... 385/53; 385/75; 385/89; 385/134
[58] Field of Search ...................... 385/53, 75, 88-94, 134, 135, 139, 147

[56] References Cited

U.S. PATENT DOCUMENTS

| | | | |
|---|---|---|---|
| 4,915,466 | 4/1990 | Sorenson et al. | 350/96.2 |
| 5,013,247 | 5/1991 | Watson | 439/55 |
| 5,134,679 | 7/1992 | Robin et al. | 385/90 |
| 5,136,671 | 8/1992 | Dragone | 385/46 |
| 5,144,691 | 9/1992 | August et al. | 385/88 |
| 5,151,961 | 9/1992 | Hvezda et al. | 385/92 X |
| 5,155,784 | 10/1992 | Knott | 385/88 |
| 5,155,785 | 10/1992 | Holland et al. | 385/89 |
| 5,155,786 | 10/1992 | Ecker et al. | 385/94 |
| 5,165,002 | 11/1992 | Cumberledge et al. | 385/92 |

Primary Examiner—John D. Lee
Attorney, Agent, or Firm—Dwight A. Marshall

[57] ABSTRACT

Optical spine backplane apparatus for interconnecting circuit cards. The apparatus comprises a central spine structure formed of a bundle of optical fibers extending between circular collars each positioned along the spine and formed around the optical fiber bundle to form a shelf for mounting circuit cards. Each circular collar has an optics pad consisting of optical transmitters and receivers coupled with ones of the optical fibers and with signal leads connected to a first coupling device. A circular collar is constructed of a bundle of electrical conductors formed around the outside of the central spine with each electrical conductor coupled to the first coupling device and to second coupling devices positioned around the outside of the collar. Each of the second coupling devices is connected by signal leads to a socket intended to receive a plug-in circuit card. The coupling devices selectively interconnect circuit cards and circuit card components via ones of the circular collar electrical conductors and optical fibers.

10 Claims, 4 Drawing Sheets

BACKPLANE OPTICAL SPINE

FIELD OF THE INVENTION

The invention relates to apparatus for interconnecting circuit cards and in particular to a backplane optical spine for mounting and interconnecting circuit cards.

BACKGROUND AND PROBLEM

Electrical and electronic equipment is oftentimes constructed of circuit cards mounting components which are interconnected to form the equipment. Typically, equipment consists of circuit card mounting frames that are constructed to receive plug-in circuit cards that are interconnected to form the electrical and electronic equipment.

Circuit card mounting frames may be constructed with rows of shelves wherein each shelf is open at the front and arranged to receive a number of the plug-in circuit cards. The back of each shelf may have a printed wiring backplane provided with connectors positioned thereon to correspond with and receive each plug-in circuit card. The contacts of the sockets are interconnected by conductors printed on the printed wiring backplane which interconnect the shelf circuit cards. Cabling is formed along the back of the circuit card mounting frame between the rows of shelves and is connected to the printed conductors of each shelf printed wiring backplane. The cabling interconnects the shelves so that each plug-in circuit card may be connected to other circuit cards in accordance with a preplanned wiring configuration of the printed wiring backplanes and interconnecting cabling.

A problem arises that even small changes in the design of the electrical and electronic equipment requires that the frame cabling and printed wiring backplane conductors be changed to effect equipment design changes. Another problem arises in that new designs of circuit cards generate heat that requires new configurations of circuit card mounting frames that dissipate heat and allow air to freely circulate among the frame mounted circuit cards. Accordingly, a need exists for backplane apparatus that allows circuit cards to be interconnected without requiring the rewiring of circuit card mounting frames and that is adaptable for use with multiple circuit card mounting frame configurations and which allows the circulation of air around mounted circuit cards.

SOLUTION

The foregoing problems are solved by circuit card mounting frame backplane optical spine apparatus arranged to mount and selectively interconnect plug-in circuit cards. The backplane apparatus comprises an optical spine having a plurality of optical fibers formed in a bundle configuration with the fibers having ends terminated in transmitter and receiver devices positioned at intervals along the optical spine corresponding with positions for mounting plug-in circuit cards. Circular collars are positioned along the optical spine at each interval corresponding with mounted ones of the circuit cards with each collar constructed of electrical conductors formed to circle the bundle of terminated optical fibers.

Optical pads are each positioned along the optical spine at each circuit card mounting interval adjacent the bundle of optical fibers and a circular collar and connect signal leads with ones of the fiber terminated transmitter and receiver devices positioned at the circuit card mounting interval. A first coupling or matrix device corresponding with each optical pad is coupled with optical pad signal leads connected with the optical fiber transmitter and receiver devices and with the circular collar electrical conductors.

Socket devices are positioned around the optical spine at each circuit card mounting interval to slidably receive one of the circuit cards and to couple the received circuit card with socket leads. Second coupling or matrix devices are also positioned around the optical spine at each circuit card mounting interval adjacent to the collar electrical conductors and are connected with ones of the collar electrical conductors and socket leads coupled with a circuit card plugged into the socket. The first and second coupling or matrix devices are operable for selectively coupling ones of the optical pad signal leads and ones of the socket leads with the circular collar electrical conductors to interconnect the plug-in circuit cards through the collar electrical conductors and optical spine fibers.

DRAWING DESCRIPTION

FIG. 1 illustrates an optical spine backplane in accordance wit principles of the invention, FIG. 2 sets forth a cross section view showing the relationship of plug-in circuit cards with the optical spine backplane set forth in FIG. 1, FIG. 3 is a view of the circular collar apparatus with respect to the optical spine bundle of fibers and plug-in circuit cards of FIGS. 1 and 2, and FIG. 4 shows a horizontal assembly of circuit cards inserted into circular collars positioned about and coupled with the circuit cards and the optical spine.

DETAILED DESCRIPTION

Figure 1:
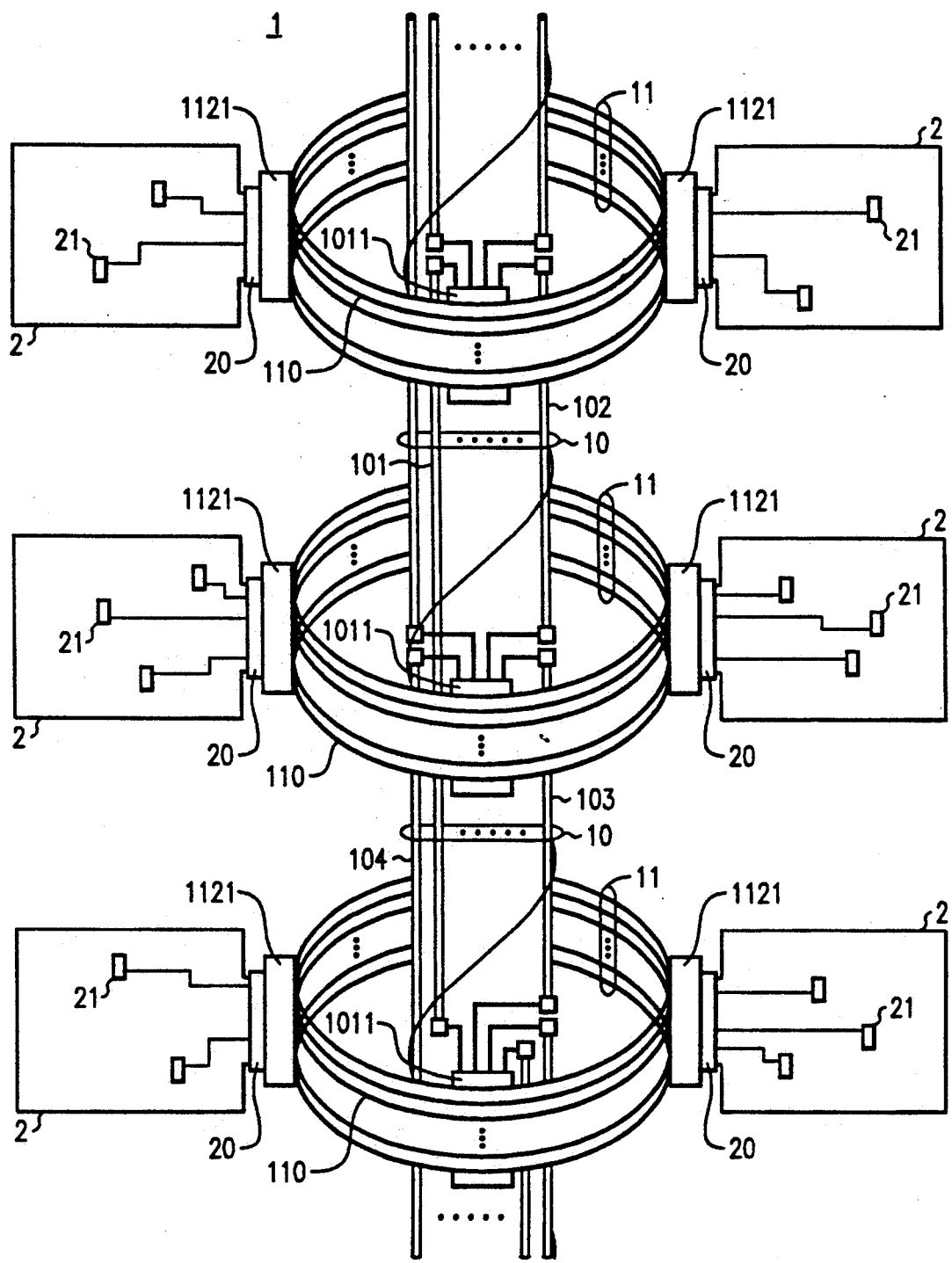

In an exemplary embodiment of the invention as set forth in FIG. 1 of the drawing, optical spine backplane 1 is intended for use with circuit card mounting frames to mount and interconnect plug-in circuit cards 2 via an optical spine 10. Optical spine 10 has a plurality of optical fibers, illustratively represented as fibers 101, 102, 103, 104, formed and laced in a bundle configuration. The fibers extend between circuit card mounting intervals and each fiber has one end terminated with a transmitter device positioned at one circuit card mounting interval and an opposite end terminated with a receiver device at another circuit card mounting interval along optical spine 10. The fibers may extend between adjacent circuit card mounting intervals and may pass through one or more circuit card mounting intervals separating circuit card mounting intervals wherein is positioned the fiber terminating transmitter and receiver devices.

Collar apparatus encircles optical spine 10 at predetermined intervals along optical spine 10 with the predefined intervals corresponding with the circuit card mounting intervals. Collar apparatus is coupled with transmitter/receiver devices 11100, FIG. 3, terminating optical fibers 101, 102, 103, 104 and with circuit cards 2 plugged into optical spine backplane 1 and selectively interconnects circuit cards 2 through the collar apparatus and optical spine 10.

Figure 3:
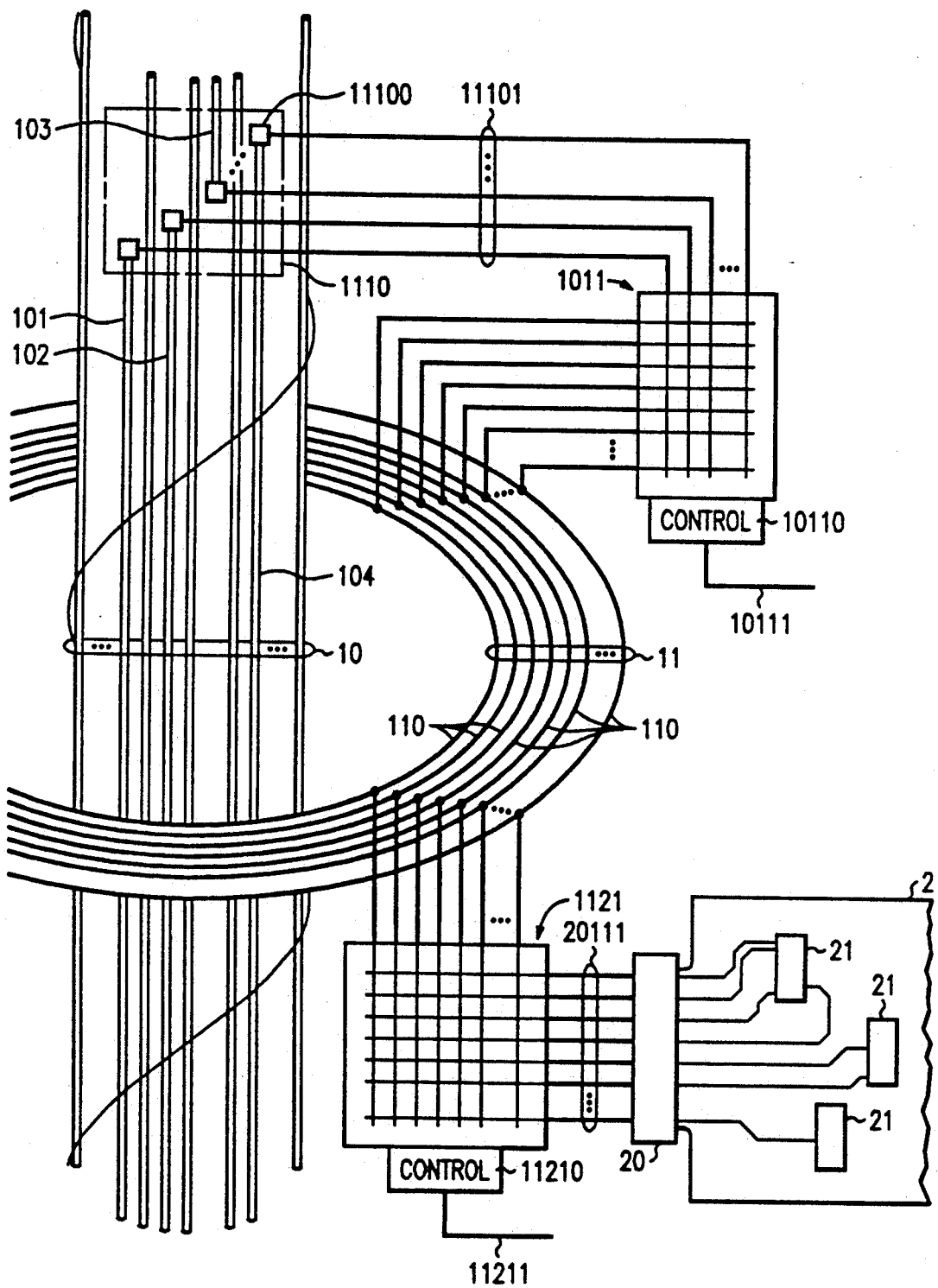

Collar apparatus, FIG. 1, has a number of circular collars 11 each positioned along optical spine 10 at one of the circuit card mounting intervals corresponding with a shelf, not shown, of a circuit card mounting frame that may be used for mounting circuit cards 2. Each circular collar 11, FIG. 3, is constructed of electrical conductors such as electrical conductors 110 formed as a bundle positioned around optical spine 10. A circular collar 11 has an optical pad 1110 connecting each of a plurality of signal leads 11101 with ones of the fiber terminated transmitter/receiver devices 11100 positioned at a circuit card mounting interval corresponding with circular collar 11.

A first coupling or matrix device 1011, positioned adjacent optical pad 1110 and circular collar 11, is coupled with optical pad signal leads 11101 and circular collar electrical conductors 110. Coupling or matrix device 1011 is operated by control 10110 and responds to control signals appearing on control lead 10111 to selectively couple ones of optical pad signal leads 11101 with ones of electrical conductors 110 and to maintain the connections until subsequently controlled by signals applied to control lead 10111 to release the connections.

The collar apparatus also has a plurality of socket devices 20 terminating socket leads 20111 and positioned around optical spine 10 adjacent circular collar 11. Each socket 20 may be any one of a number of well known socket devices and need not be described in detail. Sufficient to say that socket 20 slidably receives a circuit card 2 and couples the received circuit card 2 with socket leads 20111. Circuit card may be any one of a number of printed wiring circuit boards each mounting components 21 that are coupled by printed conductors with either fingers or a connector positioned on one end of circuit card 20. Socket contacts receive the inserted circuit card fingers or connector contacts and couples the circuit card conductors with socket leads 20111.

A plurality of second coupling or matrix devices 1121 are positioned around optical spine 10 adjacent to circular collar electrical conductors 110 and circuit card sockets 20. Each second coupling or matrix device 1121 is connected with ones of circular collar electrical conductors 110 and socket leads 20111. Signals appearing on control lead 11211 enable control 11210 to operative coupling or matrix device 1121 to selectively interconnect circular collar electrical conductors 110 with one of socket leads 20111.

Figure 2:
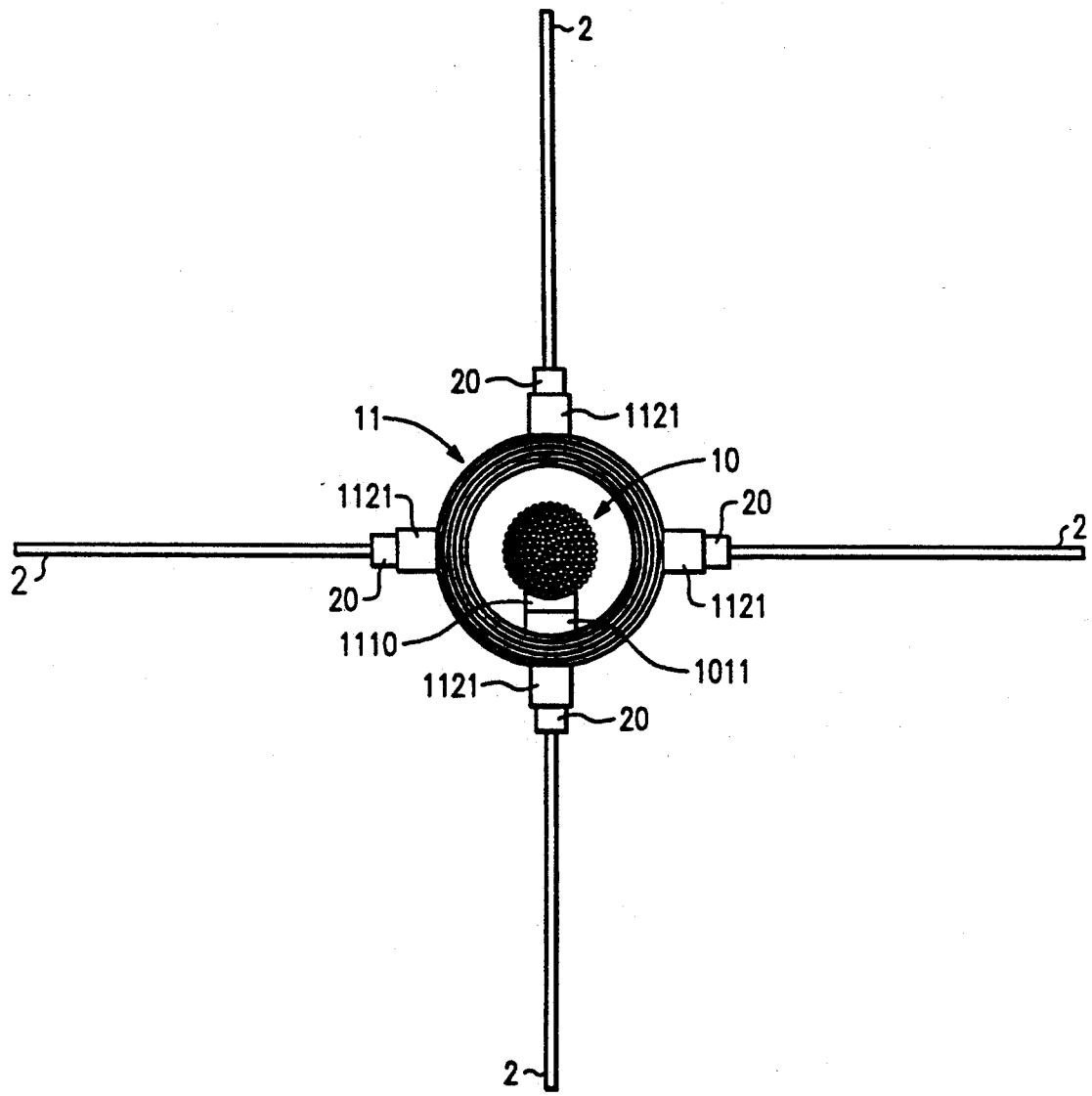
Figure 4:
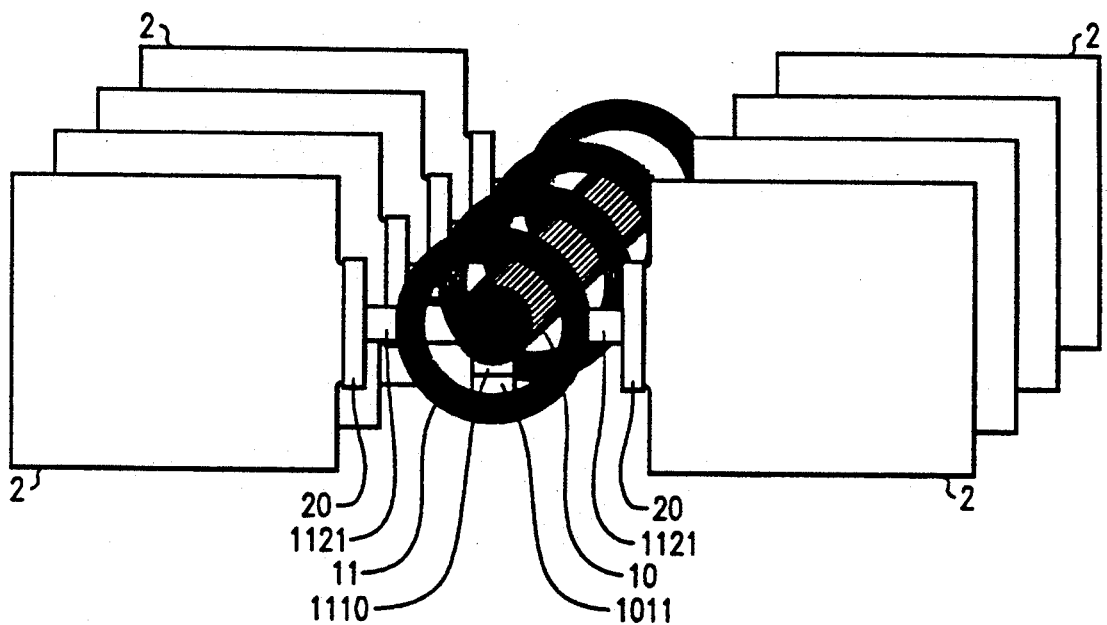

In one embodiment of the invention as set forth in FIG. 2, optical spine backplane apparatus 1 may receive and mount circuit cards 2 in a vertical assembly. In this assembly, circuit cards 2 plugged into sockets 20 are mounted vertically at predetermined intervals along and positioned around optical spine backplane 1 at sockets 20 connected with circular collars 11. Another embodiment of the invention set forth in FIG. 4, shows circuit cards 2 mounted in a horizontal assembly. In this assembly, circuit cards 2 plugged into sockets 20 are mounted horizontally at predetermined intervals along and around optical spine backplane 1 at sockets 20 connected with circular collars 11. Such mounting arrangements permits air to circulate around and about the mounted circuit cards 2 to cool circuit card components 21. In yet another embodiment of the invention, circular collar 11 may be formed in an arc about optical spine 10.

Control signals applied to leads 11211 and 10111, FIG. 3, enable controls 11210, 10110 to operate coupling or matrix devices 1121, 1011 to selectively connect circular collar conductors 110 with ones of socket leads 20111 and signal leads 11101 to connect circuit cards 2 and components 21 with appropriate transmitter/receiver devices 11100 terminated with fibers 101, 102, 103, 104 of optical spine 10. Thus, circuit cards 2 and circuit card components 21 can be selectively interconnected by circular collar electrical conductors 110 and by combinations of circular collar conductors 110 and optical fibers 101, 102, 103, 104 without requiring the rewiring of circuit card mounting frames.

What is claimed is:

1. Backplane apparatus for mounting and interconnecting circuit cards wherein said backplane apparatus comprises
    an optical spine having a plurality of optical fibers formed in a bundle configuration with the fibers having ends thereof terminated in transmitter/receiver devices, and
    collar apparatus encircling said optical spine at predetermined intervals along said optical spine and coupled with said transmitter/receiver devices and said circuit cards for selectively interconnecting said circuit cards through said collar apparatus and said optical spine fibers.

2. The circuit card interconnecting optical backplane apparatus set forth in claim 1 wherein said optical spine comprises
    fibers extending between ones of the collar apparatus with each fiber having one end terminated with a transmitter device positioned at one predetermined interval and an opposite end terminated with a receiver device at another predetermined interval along said optical spine.

3. The circuit card interconnecting optical backplane apparatus set forth in claim 2 wherein said collar apparatus comprises
    a plurality of circular collars each positioned along said optical spine at one of the predetermined intervals corresponding with a shelf for mounting ones of the circuit cards and each constructed of electrical conductors formed around the bundle of said terminated fibers.

4. The circuit card interconnecting optical backplane apparatus set forth in claim 3 wherein each circular collar comprises
    an optical pad connecting each of a plurality of signal leads with ones of the fiber terminated transmitter and receiver devices positioned at a predetermined interval corresponding with the circular collar.

5. The circuit card interconnecting optical backplane apparatus set forth in claim 4 wherein each circular collar comprises
    a first coupling device coupled with said optical pad signal leads and said circular collar electrical conductors and operable to selectively couple ones of said signal leads with ones of said electrical conductors.

6. The circuit card interconnecting optical backplane apparatus set forth in claim 5 wherein each circular collar comprises
    a plurality of socket devices terminating socket leads and positioned around said optical spine and each slidably receiving one of the circuit cards and coupling of one received circuit card with the socket leads.

7. The circuit card interconnecting optical backplane apparatus set forth in claim 6 wherein each circular collar comprises
    a plurality of second coupling devices positioned around said optical spine adjacent to said collar electrical conductors and said circuit card sockets and each connected with ones of said collar electrical conductors and said socket leads and operable to selectively interconnect said collar electrical conductors with said socket leads.

8. The circuit card interconnecting optical backplane apparatus set forth in claim 7 wherein each first and second coupling devices comprises signal means connected with control devices of said first and second coupling devices for controlling said first and second coupling devices to selectively interconnect said circuit cards through said collar electrical conductors and said optical spine fibers.

9. Backplane apparatus for mounting and interconnecting circuit cards wherein said backplane apparatus comprises an optical spine having a plurality of optical fibers formed in a bundle configuration with the fibers having ends thereof terminated in transmitter and receiver devices positioned at predetermined intervals along said optical spine corresponding with positions mounting ones of the circuit cards, collar apparatus positioned along said optical spine at each of the predetermined intervals and each constructed of a bundle of electrical conductors formed around the bundle of said terminated fibers, and interconnecting apparatus receiving ones of the circuit cards and positioned along said optical spine at said predetermined intervals adjacent said bundle of fibers and said bundle of electrical conductors and interconnecting said collar apparatus electrical conductors with ones of the fiber terminated transmitter and receiver devices and received circuit cards and operable to selectively interconnect said received circuit cards through said collar electrical conductors and said optical spine fibers.

10. Backplane apparatus for mounting and interconnecting circuit cards wherein said backplane apparatus comprises an optical spine having a plurality of optical fibers formed in a bundle configuration with the fibers having ends thereof terminated in transmitter and receiver devices positioned at predetermined intervals along said optical spine corresponding with mounted ones of the circuit cards, a plurality of circular collars each positioned along said optical spine at one of the predetermined intervals corresponding with the mounted ones of the circuit cards and each constructed of electrical conductors formed around the bundle of said terminated fibers, a plurality of optical pads each positioned along said optical spine at said one predetermined interval adjacent said bundle of fibers and connecting each of a plurality of signal leads with ones of the fiber terminated transmitter and receiver devices positioned at said one predetermined interval corresponding with a circular collar, a plurality of first matrix devices each coupled with said optical pad signal leads and said circular collar electrical conductors and operable to selectively couple ones of said signal leads with ones of said circular collar electrical conductors, a plurality of socket devices terminating socket leads and positioned around said optical spine at said predetermined intervals and each slidably receiving one of the circuit cards and coupling the one received circuit card with the socket leads, a plurality of second matrix devices positioned around said optical spine at said predetermined intervals adjacent to said collar electrical conductors and said circuit card sockets and each connected with ones of said collar electrical conductors and said socket leads and operable to selectively interconnect said collar electrical conductors with said socket leads, and signal means connected with said first and second matrix devices for controlling said first and second matrix devices to selectively couple ones of said signal leads and said socket leads with said circular collar electrical conductors to interconnect said received circuit cards through said collar electrical conductor and said optical spine fibers.

* * * * *